United States Patent [19]
Griffiths et al.

[11] Patent Number: 6,087,546
[45] Date of Patent: Jul. 11, 2000

[54] DECOMMISSIONED REACTOR VESSEL PACKAGE AND METHOD OF MAKING SAME

[76] Inventors: Geoffrey M. Griffiths, 31 Turkey Roost Rd., Sandy Hook, Conn. 06482; James A. Fennema, 101 W. Main St., #2, Niantic, Conn. 06357

[21] Appl. No.: 08/901,498

[22] Filed: Jul. 28, 1997

[51] Int. Cl.[7] .................................................. G21F 9/00
[52] U.S. Cl. ...................... 588/3; 250/506.1; 250/507.1; 376/260; 976/DIG. 393
[58] Field of Search .................... 588/1, 3; 250/506.1, 250/507.1; 376/260; 976/DIG. 393

[56] References Cited

U.S. PATENT DOCUMENTS

| | | | |
|---|---|---|---|
| 4,594,774 | 6/1986 | Barker et al. | |
| 4,818,472 | 4/1989 | Operschall et al. | 376/260 |
| 5,297,182 | 3/1994 | Cepkauskas | |
| 5,301,212 | 4/1994 | Jacquier et al. | 376/260 |
| 5,329,562 | 7/1994 | Setsuo | |

*Primary Examiner*—Ngoclan Mai

[57] ABSTRACT

The container has inward lugs with vertical holes. The vessel is bolted to it using the closure-head-securing bolt holes. The method involves raising the reactor vessel inside a cylindrical shell using lifting studs in the vessel head-securing bolt holes to raise it and then securing the vessel by studs in other bolt holes to hold it to the lugs. The bottom wall is secured to the container shell and the clearance space between the vessel and the container is filled with concrete. The top wall is then secured on the container shell.

8 Claims, 9 Drawing Sheets

DECOMMISSIONED REACTOR VESSEL PACKAGE AND METHOD OF MAKING SAME

FIELD OF THE INVENTION

This invention relates to a nuclear reactor disposal package and to a method of decommissioning a commercial nuclear reactor by enclosing the reactor vessel in a container.

BACKGROUND OF THE INVENTION

At the end of the operating life of a nuclear reactor assembly, the owner is presented with three decommissioning alternatives. Entombment consists of placing the reactor vessel and other parts of the assembly in a sealed condition for an indefinite period of time to allow the ionizing radiation to decay to acceptable levels. At that time the assembly may be modified further or removed. Mothballing consists of placing and maintaining portions of the assembly in protective storage for a period of time before dismantling the assembly. Prompt Removal is the removal of all radioactive components of the assembly without the delays accompanying the entombment and mothballing alternatives.

The most cost-effective alternative has been determined by the nuclear industry to be prompt removal. The nuclear reactor vessel, along with its internal components, comprise the majority of the radioactivity at a shut-down commercial nuclear power facility.

The disposal of spent (used) nuclear reactor fuel in the United States is typically the responsibility of the United States Department of Energy (DOE). The reactor fuel will be transferred to the DOE, independent of the reactor vessel and internals disposal. Therefore, the nuclear reactor will not be packaged and transported with reactor fuel.

In the prompt removal process, the reactor vessel internals have been segmented, removed, and packaged for transportation and disposal in small transportation containers and shielded casks. This requires the handling of components with high curie contents generating high radiation doses. This type of radioactive material must be packaged and transported to satisfy the regulations of both the United States Nuclear Regulatory Commission and the United States Department of Transportation. The packaging and transportation effort is further complicated by the weight of the reactor vessel, typically measured in the hundreds of tons.

Techniques exist to segment the reactor vessel and internals in order to reduce the physical size and curie content of material loaded into licensed transportation containers. These techniques require a substantial amount of underwater cutting and material handling due to the high radiation levels associated with the components.

If the vessel is removed and transported intact without segmenting it as described, risk is involved. The steel reactor vessel is subjected to neutron radiation during the operation of the reactor. This radiation causes a change in the molecular structure of the steel, making it brittle. This embrittlement is a risk to the integrity of the reactor vessel if the vessel is packaged as its own transportation container without a container outside.

This invention is a package containing and protecting the vessel and provides a method of packaging the reactor vessel, with the internal components intact, into a single container, thus reducing the cost of preparation activities and exposure of workers to ionizing radiation. This package, when fitted with external impact limiters and tiedown devices, meets the transportation requirements for a Type B package as defined in Title 10 of the Code of Federal Regulations, Part 71. Additionally, it reduces the total volume of radioactive waste for disposal.

This invention thus eliminates the need to segment the reactor vessel and internals for packaging and transportation, and eliminates the segmentation of portions of the reactor vessel internals into waste which is considered Greater-Than-Class-C. This type of waste is a significant problem, since it is generally not accepted for disposal in near-surface land disposal facilities, the only type of radioactive waste disposal facility currently operating within the United States. This invention reduces the concentration of Greater-then-Class-C waste by averaging the Greater-than-Class-C waste with other materials in the vessel. These reduced concentrations generally allow the package to meet acceptable criteria for burial in near-surface land disposal facilities.

SUMMARY OF THE INVENTION

The invention is a package comprised of a steel outer container having top and bottom heads and a continuous sidewall shell therebetween. The sidewall shell is secured thereto and extends inward therefrom a plurality of support lugs, all being at the same level and having vertical bores therethrough. Under the invention, the reactor vessel is a cup-shaped reactor shell having an upwardly facing annular lip, containing and supporting operating components. A closure head sits on the lip, the head being vertically apertured above the lip and the lip being bored and formed with internal threads in alignment with the apertures. The vessel is disposed in the outer container, the outer container and the reactor vessel defining between them a clearance space.

A plurality of threaded studs engage the threaded bores in the lip respectively, and extend up through the respective apertures in the head and through the respective lugs.

A plurality of threaded nuts are disposed on the respective studs above the lugs, each nut compressing the lug and the closure head against the lip of the reactor shell to secure the vessel in the outer container. A mass of concrete substantially fills the clearance space.

The invention may also be expressed as a method by which this invention packages the reactor vessel and internals. The reactor vessel is lifted up into a heavy-wall steel cylinder shell and secured there. Specifically, the invention uses the existing reactor vessel/closure head/stud holes both to attach a lifting device to the reactor vessel, and to attach the reactor vessel to lugs inward from the steel cylinder shell to support the reactor vessel.

As will be seen later with reference to the drawings, an open-ended steel cylinder shell is used to accomplish the objective. The shell is designed to both support the structural loads and provide the radiation shielding necessary to meet transportation regulations. It is also fitted with support lugs to support the weight of the reactor vessel. In order to trim the reactor coolant nozzles to fit within the package, the steel cylinder is floor-supported on a ring. The ring is fabricated with notches to give access to the reactor coolant nozzles. The ring provides both radiation shielding for the nozzle-cutting workers, and temporarily supports the steel cylinder during nozzle-cutting operations.

Prior to lifting the reactor vessel into the steel cylinder shell, all connections to the reactor vessel are cut and the vessel is injected with a Low-density Cellular Concrete. The purpose of the Low-density Cellular Concrete is to "fix" the loose radioactive surface contamination which may be present in the reactor vessel.

A lifting device is installed on the reactor vessel using the closure stud-holes as attachment points. The reactor closure head is securely attached to the reactor vessel by utilizing a plurality of the existing reactor head closure studs and nuts. The reactor vessel, with the installed internals, is lifted vertically until the reactor coolant nozzles are positioned in the notches of the steel cylinder support ring. While the reactor vessel is supported by the lifting device, the reactor coolant nozzles are trimmed to a size to fit within the steel cylinder. The reactor vessel is then lifted to its final position within the steel cylinder shell until the reactor closure head stud-holes are aligned with the steel cylinder support lugs. The reactor vessel is then securely attached to the steel cylinder shell using studs through the lugs and nuts similar to the original reactor closure head stud and nut design.

With the reactor vessel securely attached to the steel cylinder, the cylinder shell is relocated and a bottom closure plate is welded in place. Subsequent to this step, the steel cylinder shell is filled with concrete of a strength required to withstand the structural forces imposed on the package during the transportation scenarios defined by the regulatory agency. Voids between the reactor vessel and transportation container are thus filled with concrete. The transportation package top wall, or upper closure plate, is installed and welded. The package is now complete. It may be placed onto a cradle assembly, secured to the assembly with tiedown devices, labeled and cushioned as required.

BRIEF DESCRIPTION OF THE DRAWINGS

Further objects and features of the invention will be clear to those skilled in the art from a review of the following specification and drawings, all of which present a non-limiting form of the invention. In the drawings.

DESCRIPTION OF THE PREFERRED EMBODIMENT

Figure 1:
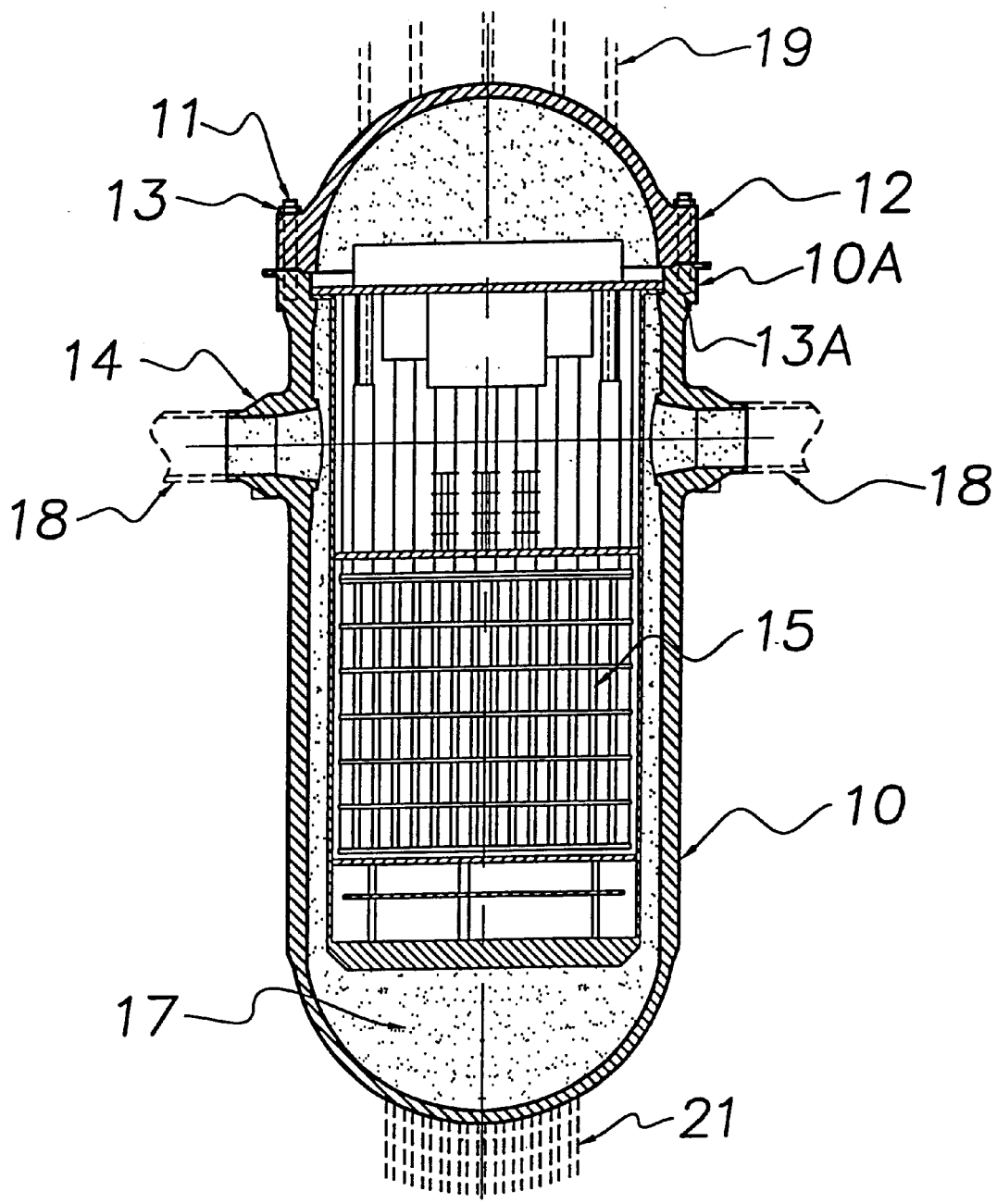
FIG. 1 is a vertical sectional view of a reactor vessel prepared for decommissioning before packaging. Removed piping and controls are shown in phantom.

Referring to the drawings, FIG. 1 discloses a nuclear reactor in section showing a cup-shaped reactor vessel 10 and a closure head 12, both filled with low-density cellular concrete 17. The reactor closure head is attached to the reactor vessel by a plurality of threaded studs and nuts 11 and 13 respectively.

The reactor vessel contains internal steel components 15 which were used during operation of the reactor primarily to direct the flow of water through the reactor, to support the nuclear fuel, and to guide the control rods as they are removed and reinserted into the fuel region of the reactor. (This invention relates to the reactor shell, reactor closure head, and internal components and does not relate to the nuclear fuel, which is assumed to be removed and stored or shipped to a U.S. government designated location.)

Instrumentation and control devices 19 and 21, used during the operation of the reactor, enter the reactor vessel through small penetrations in the top and bottom of the reactor. Reactor coolant piping 18 is welded to the reactor coolant nozzles 14 for operation of the reactor. The instrumentation and control devices and reactor coolant piping have been removed and the reactor vessel has been filled with low-density cellular concrete prior to reactor decommissioning as shown in FIG. 1.

Figure 2:
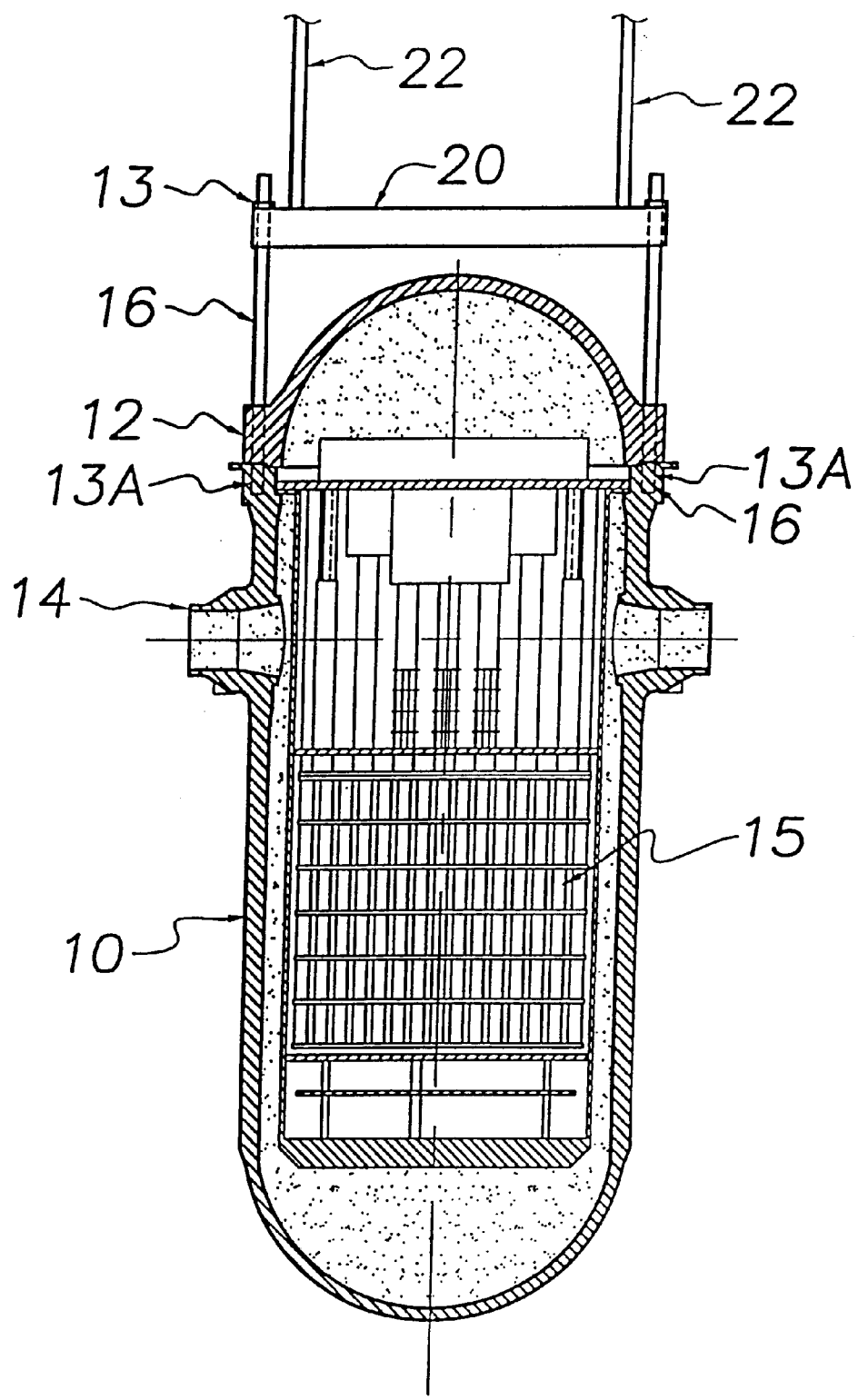
FIG. 2 is a sectional view of a nuclear reactor vessel with a lifting device connected to extended-length reactor-closure-head studs.

The reactor vessel is formed with an enlargement about its annular lip 10A. The lip 10A is formed with vertical threaded stud or bolt holes 13A. In FIG. 2, the reactor vessel 10 and reactor closure head 12 are shown after decommissioning preparatory steps have been completed. A plurality of reactor-closure-head studs 11 formerly in the threaded bolt holes 13A have been replaced with extended-length lifting studs 16. A lifting device 20 and 22 has been connected to the extended-length lifting studs 16.

Figure 3:
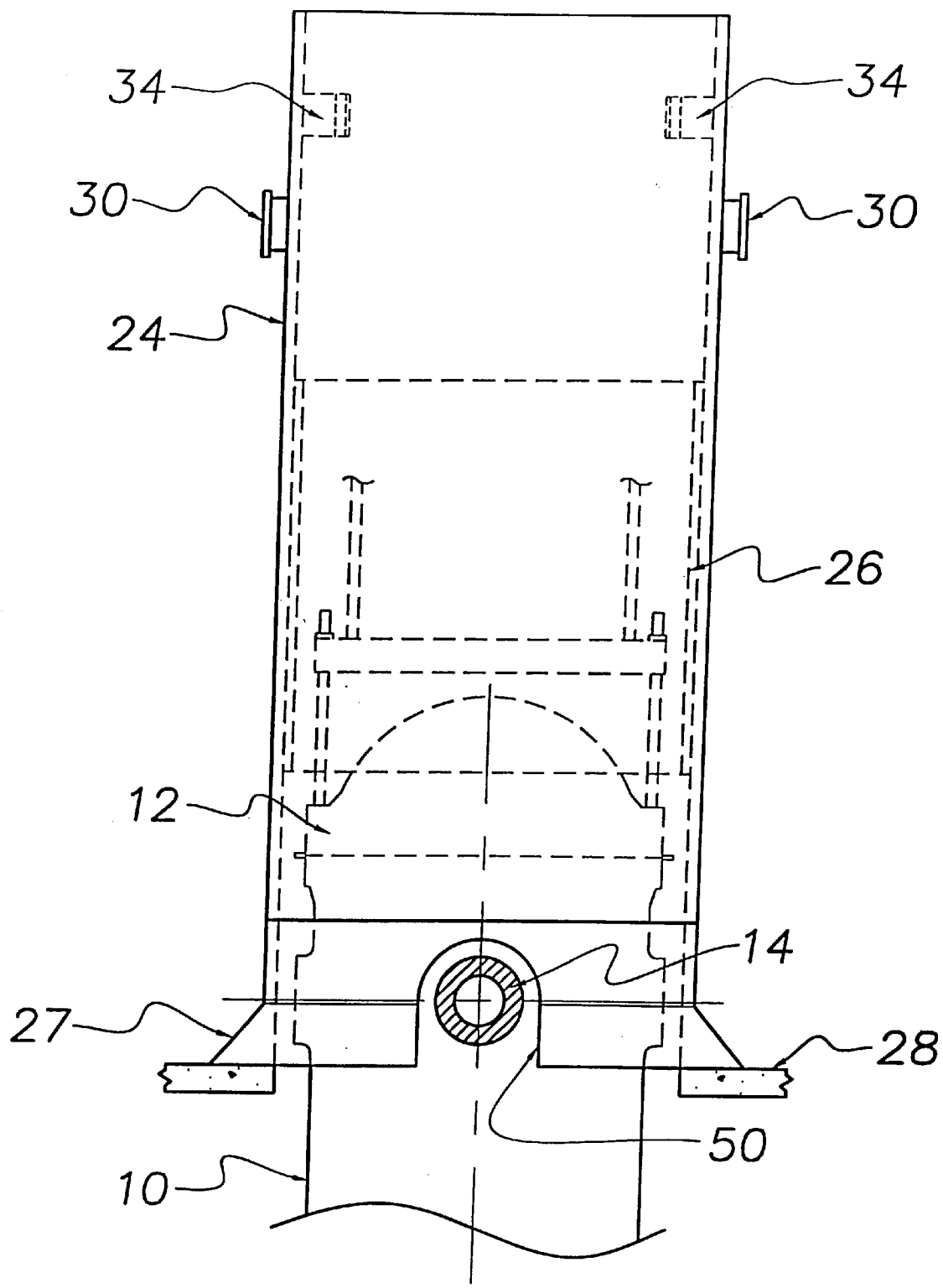
FIG. 3 is a front view of the container with the reactor vessel, shown fragmentary, partially raised into position inside the container. The reactor coolant nozzles are positioned in the package support ring access notches prior to final cutting close to the reactor wall.

In FIG. 3 the reactor vessel is lifted to a position exposing the reactor coolant nozzle 14 through a notch 50 in a special temporary support ring 27 resting on plant floor 28 above the existing floor. The reactor coolant nozzles 14 are then cut close to the reactor vessel shell to allow the reactor vessel to be lifted into the transportation container shell 24. The steel support ring 27 provides shielding for the workers during nozzle-cutting equipment setup and operation. The steel support ring 27 also provides support for the container shell 24 and reactor vessel 10 and reactor closure head 12. After cutting the reactor coolant nozzles, the lifting process is continued.

Figure 4:
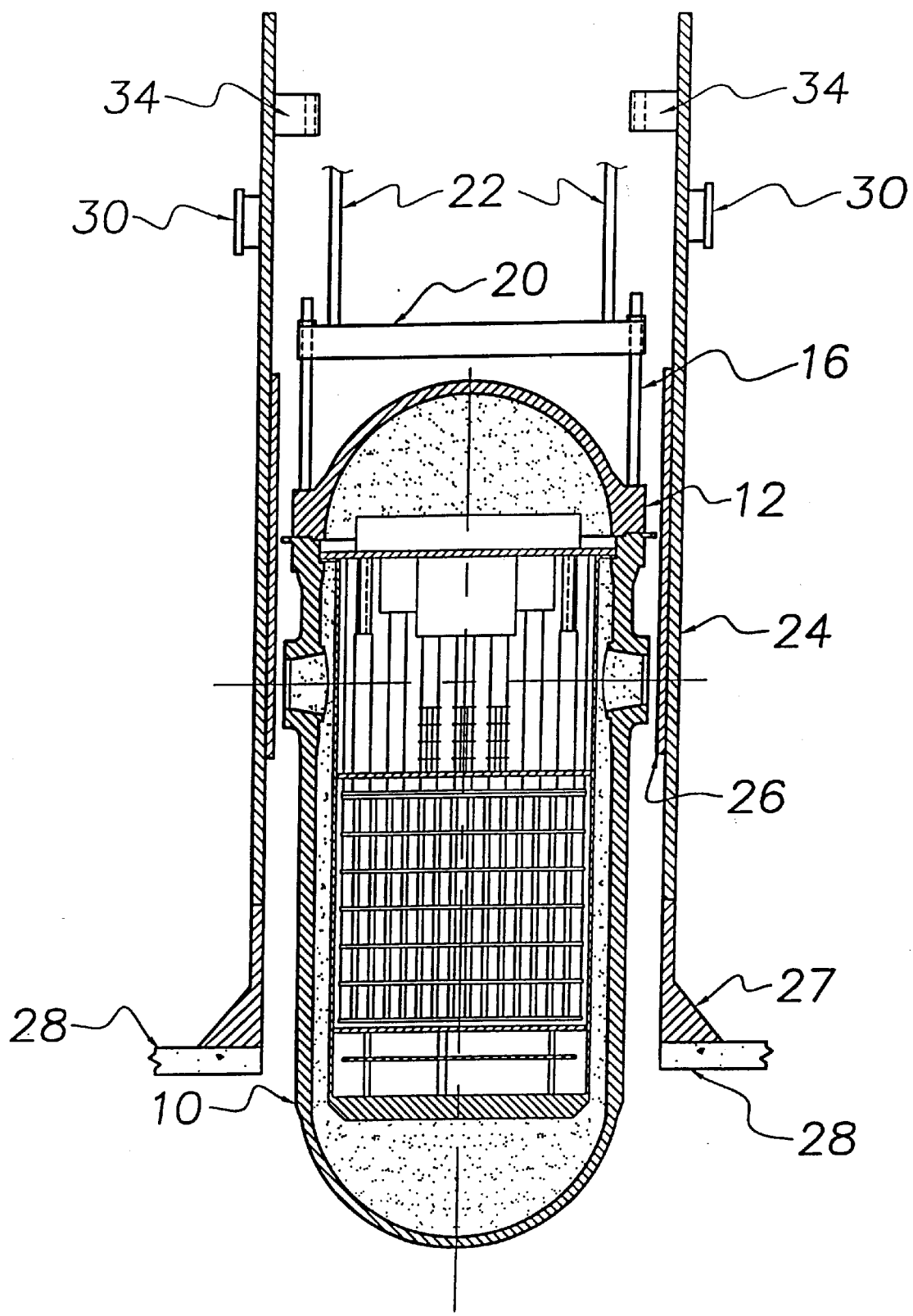
FIG. 4 is a sectional view of the container and the reactor vessel with the vessel near final position inside the transportation package after the reactor coolant nozzles have been cut close to the reactor vessel wall.

In FIG. 4 the steel transportation container shell 24 is shown provided with a supplemental steel shielding 26. The reactor vessel 10 and reactor closure head 12 are shown partially lifted into the container shell 24. The container shell is shown provided with inward reactor support lugs 34.

Figure 5:
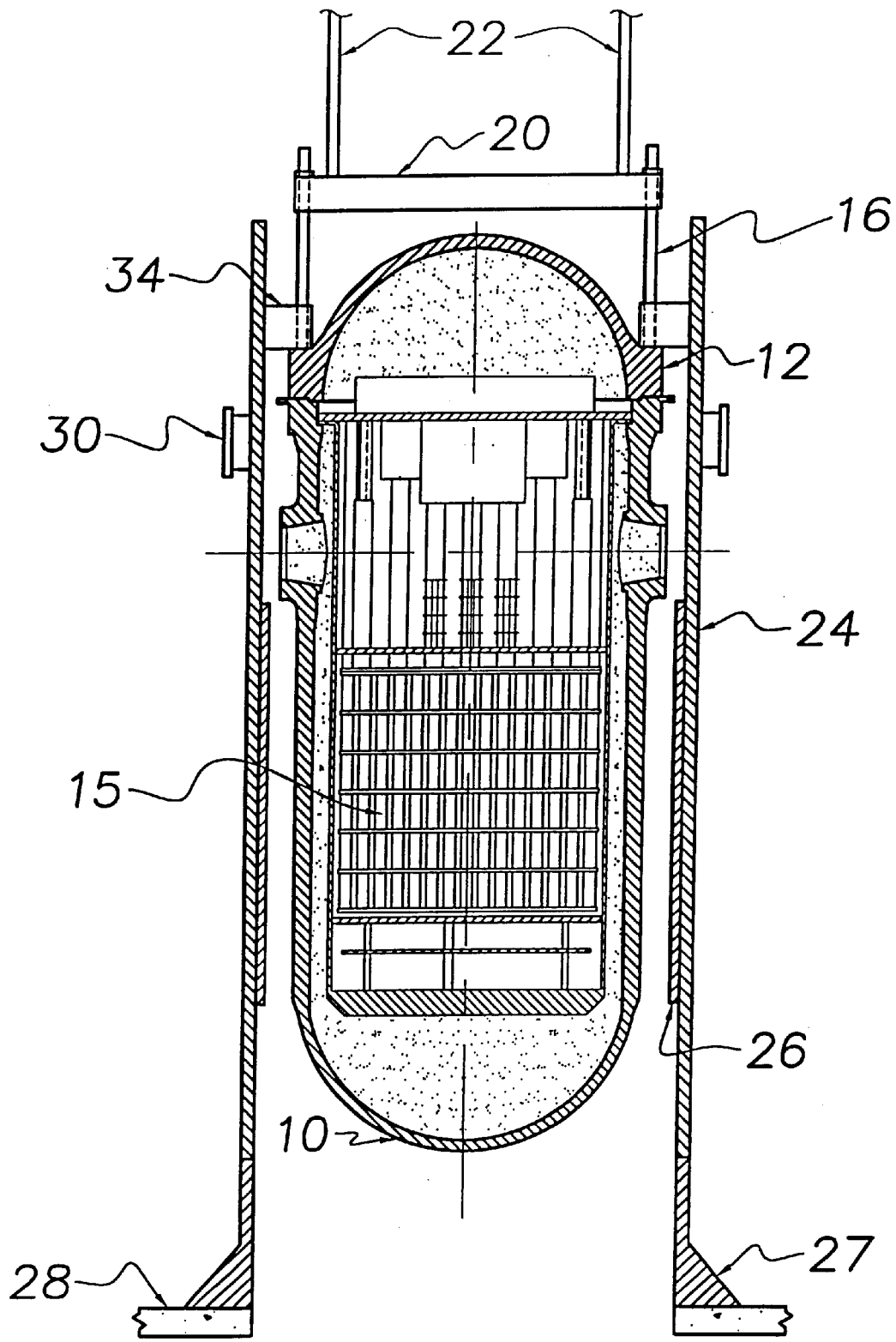
FIG. 5 is a sectional elevation on the line 5—5 of FIG. 7 with the container lugs positioned to avoid interference with the vessel and the lifting apparatus.

In FIG. 5 the nuclear reactor 10, 12 is raised into position inside the transportation package cylinder shell 24. The container is positioned such that the lifting apparatus including the bar 20 and secondary studs 16 do not interfere with the lugs 34.

Figure 6:
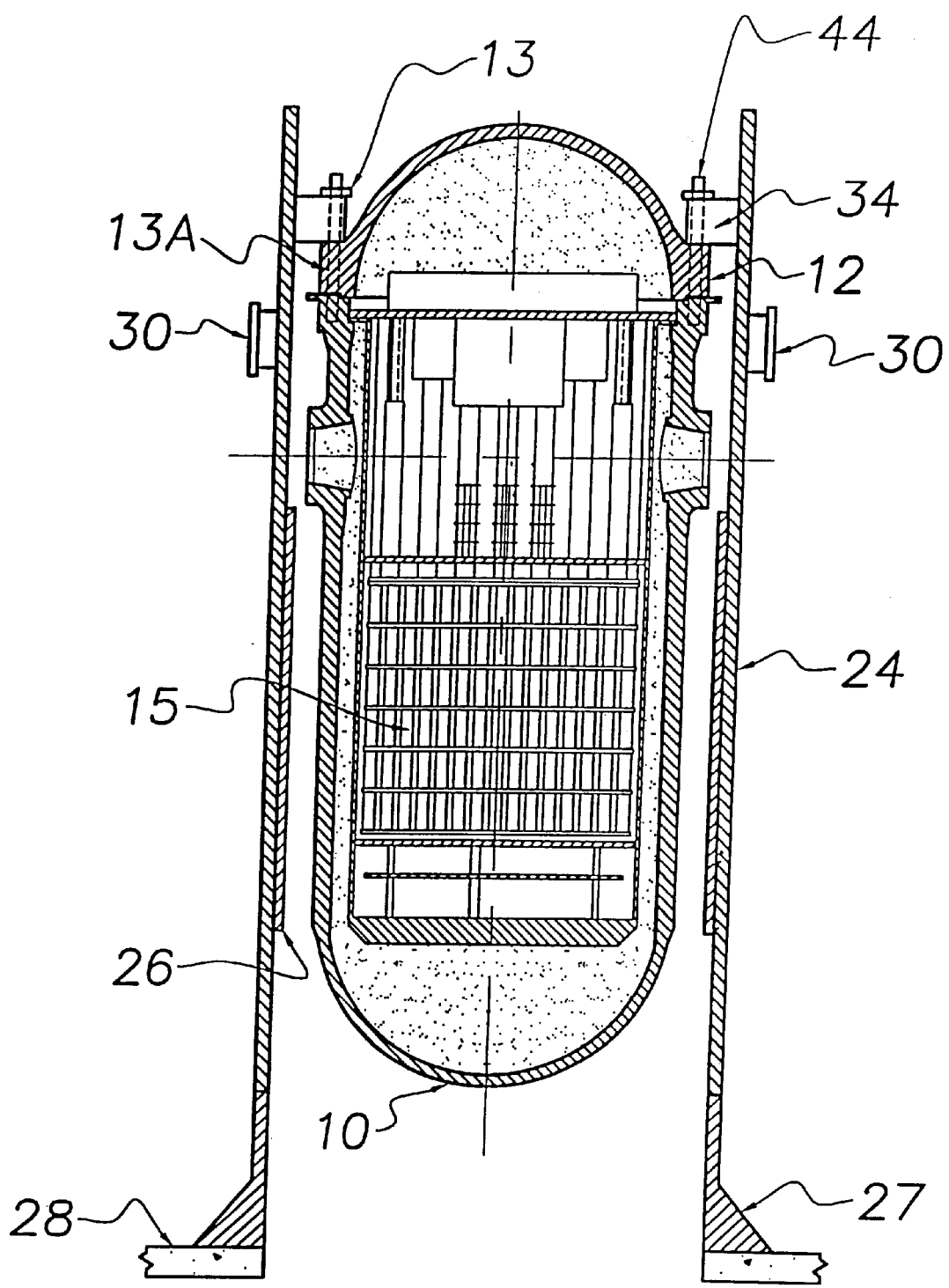
FIG. 6 is taken on the same plane as FIG. 4 and showing the vessel studded to the lugs.

In FIG. 6 the reactor vessel is bolted to the reactor support lugs 34 by securing the final holding studs 44 through the lugs 34 and into bolt holes 13A in the vessel from which the bolts have been removed. Nuts 13 are placed on the studs and tightened. Lifting of the partially complete transportation package defined by the vessel 10, 12 and container shell 24 can be accomplished using the package lifting trunnions 30 which are mounted on the outside of the container shell 24.

Figure 7:
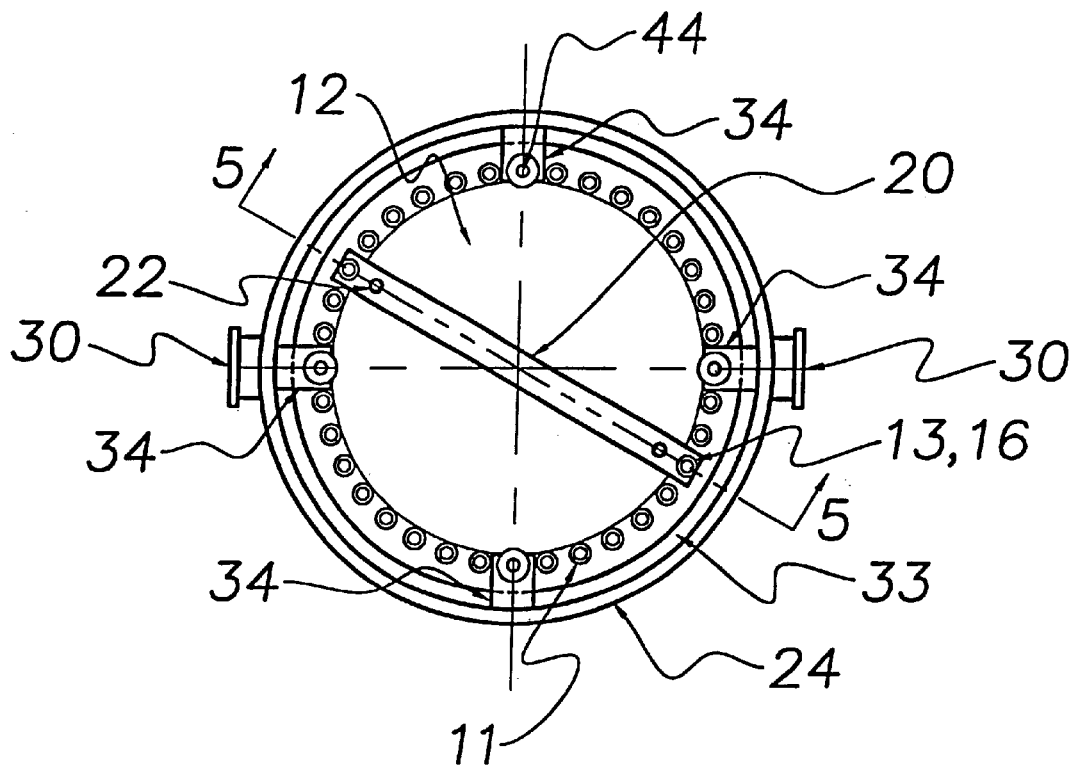
FIG. 7 is a top plan view of the transportation package showing the reactor vessel support lugs, and package lifting trunnions.

In FIG. 7 the reactor inward support lugs 34 and package lifting trunnions 30 are shown in plan view, attached to the transportation container shell 24. A clearance space 33 is shown between the vessel 10, 12 and the container shell 24.

Figure 8:
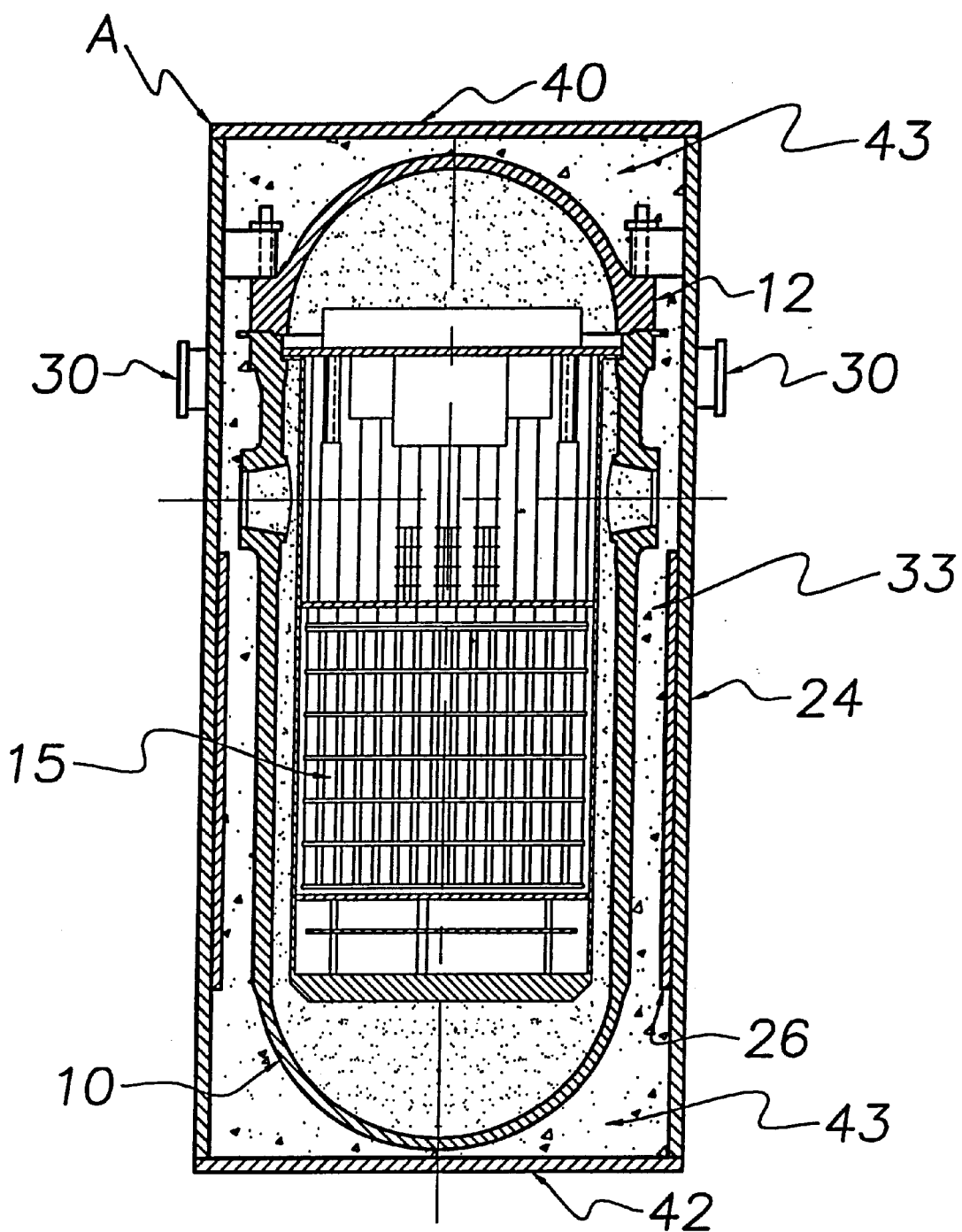
FIG. 8 is a vertical sectional view of the reactor vessel inside the transportation container with the top and bottom walls in place, and concrete filling the clearance space between the reactor vessel and the container.

In FIG. 8 the reactor vessel is shown in vertical sectional view within the transportation container 24. The transportation container upper cover plate 40 or top wall and transportation package lower cover plate or bottom wall 42 are installed on the shell 24 by welding. The clearance space 33 between the reactor vessel and the transportation container 24, 40 and 42 is filled with concrete 43. This stabilizes the reactor vessel within the package transferring the inertia loads of the reactor vessel to the container. This provides additional shielding against ionizing radiation.

Figure 9:
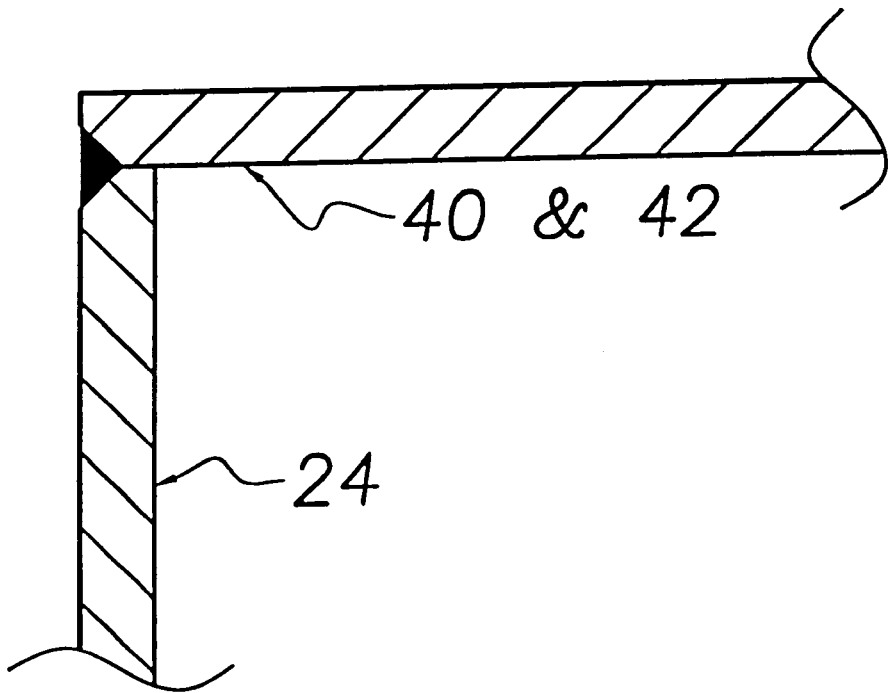
FIG. 9 is a typical detail of the welded connection between the container steel cylinder shell and the top and bottom walls.

FIG. 9 provides a sectional view of the welded connection between the package wall 24 and the upper and lower cover plates 40 and 42.

The invention is thus a transportation package A (FIG. 8) which completely envelopes a nuclear reactor vessel and head 10, 12 with internal components intact. The invention includes the method of placing the nuclear reactor vessel inside the transportation shell to minimize the exposure of workers to ionizing radiation since the reactor vessel is completely enclosed in the container. It also minimizes the overhead clearance requirements for rigging and lifting the reactor vessel into the package. No part of the reactor vessel is used as a part of the containment boundary of the package. No welding of attachments is performed on the reactor vessel for the purpose of creating the package containment boundary.

Variations in the invention are possible. Thus, while the invention has been shown in only one embodiment, it is not so limited but is of a scope defined by the following claim language which may be broadened by an extension of the right to exclude others from making, using or selling the invention as is appropriate under the doctrine of equivalents.

What is claimed is:

1. A method of decommissioning a nuclear reactor vessel comprising the steps of:
   a. lifting the reactor vessel into a cylindrical open-ended shell by using existing reactor closure head attachment stud holes,
   b. providing inward lugs on the shell, the lugs having vertical holes,
   c. bolting the reactor vessel within the shell using studs extending through the vertical holes engaging existing reactor closure head attachment stud holes,
   d. securing a bottom wall on the shell to form a container;
   e. filling any clearance space between the vessel and the container with concrete, and
   f. securing a top wall in the container.

2. A method as claimed in claim 1 which packages all portions of the reactor vessel internal components, including the portion of internal components which would otherwise be classified as Greater-Than-Class-C radioactive waste if removed individually.

3. A nuclear reactor disposal package comprising:
   a. a steel outer container having top and bottom walls and a continuous side wall shell therebetween, the side wall shell having secured thereto and extending inward therefrom a plurality of support lugs having vertical bores therethrough, the lugs all being at the same level,
   b. a reactor vessel defined by a cup-shaped reactor shell having an upwardly facing annular lip, containing and supporting operating components and a closure head sitting on the lip, the head being vertically apertured above the lip and the lip of the vessel being bored and formed with internal threads in alignment with the apertures, the vessel being disposed in the outer container, the outer container and the reactor vessel defining between them a clearance space,
   c. a plurality of threaded studs engaging the threads in the bores in the lip respectively, extending up through the respective apertures in the head and through the respective lugs,
   d. a plurality of threaded nuts disposed on the respective studs above the lugs, each compressing the lug and the closure head against the lip of the reactor shell to secure the vessel in the outer container, and
   e. a mass of concrete substantially filling the clearance space.

4. A disposal package as claimed in claim 3 wherein a portion of the side wall is covered with a layer of steel shielding.

5. A disposal package as claimed in claim 4 wherein the steel shielding is at the level of the operating components.

6. A disposal package as claimed in claim 3 wherein a mass of low-density cellular concrete is disposed within the reactor vessel.

7. A disposal package as claimed in claim 3 wherein the top wall and bottom wall are secured to the side wall by a bead of welding.

8. A disposal package as claimed in claim 3 wherein the outer container is provided with lifting trunnions.

* * * * *